United States Patent [19]
Sutton et al.

[11] Patent Number: 5,738,411
[45] Date of Patent: Apr. 14, 1998

[54] VEHICLE SEAT ASSEMBLY

[75] Inventors: Mark Sutton, Westland; Donald Cannell, Walled Lake; Joseph Prosniewski, Brownstown Township; Raghu Nannapaneni, Southfield, all of Mich.

[73] Assignee: Hoover Universal, Inc., Plymouth, Mich.

[21] Appl. No.: 787,626

[22] Filed: Jan. 23, 1997

[51] Int. Cl.$^6$ ................................................ B60N 2/02
[52] U.S. Cl. .............................. 297/378.12; 297/408
[58] Field of Search .......................... 297/378.12, 378.1, 297/391, 408, 183.1, 183.6, 183.7, 313, 337, 331, 335

[56] References Cited

U.S. PATENT DOCUMENTS

| | | | |
|---|---|---|---|
| 3,449,012 | 6/1969 | Caron . | |
| 4,376,552 | 3/1983 | Pilhall | 297/378.1 X |
| 4,536,027 | 8/1985 | Brennan | 297/378.12 X |
| 5,145,233 | 9/1992 | Nagashima | 297/408 |
| 5,181,758 | 1/1993 | Sandvik . | |
| 5,328,243 | 7/1994 | Akiyama | 297/378.12 |
| 5,398,995 | 3/1995 | Hurite | 297/378.1 X |
| 5,570,931 | 11/1996 | Kargilis et al. | 297/378.12 |

*Primary Examiner*—Milton Nelson, Jr.
*Attorney, Agent, or Firm*—Harness, Dickey and Pierce, P.L.C.

[57] ABSTRACT

A seat assembly which is movable from a use position to a stored position having an upwardly extending headrest which is first rotated to a stored position thereby lowering the overall height of the seat back prior to storing the seat back. The headrest is coupled to a lower seat back latch such that upon rotation of the headrest to its stored position, the lower seat back latch is released enabling the seat back to then be rotated to its stored position. The result is a single handed operation of moving the headrest to its stored position and moving the entire seat back to its stored position.

11 Claims, 4 Drawing Sheets

VEHICLE SEAT ASSEMBLY

BACKGROUND AND SUMMARY OF THE INVENTION

The present invention relates to a vehicle seat assembly which has a rotatable or folding headrest to reduce the height of the seat back for storage purposes. In particular, the invention pertains to such a seat assembly in which the headrest is coupled to a seat back latch for actuating the seat back latch upon rotation of the headrest thereby releasing the seat back for rotation to a storage position.

In certain vehicles, particularly sport utility vehicles, it is common to equip the vehicle with second row seats that can be moved from their normal use positions to stored positions, providing increased cargo carrying capacity in the vehicle. Various mechanisms have been developed for moving the seats to the stored position. One common manner of storing the seat is to first rotate the horizontal seat cushion forward and upward so that it moves to an upright position immediately behind the seat back of the front row seats. The seat back is then rotated forward and downward to a horizontal position generally occupying the space previously occupied by the seat cushion. A hard panel on the rear surface of the seat back forms a continuation of the vehicle cargo load floor.

It is becoming increasingly popular to equip second row seats with headrests that extend upwardly from the upper end of the seat back. Providing such a headrest, often produces a packaging problem for the seat back when it is moved to its stored position. With the addition of the headrest, the overall height of the seat back is often greater than the space available for storing the seat back in a horizontal position. One approach to this packaging problem is to require that the headrest first be removed from the seat back before the seat back is rotated to its stored position. A provision is often made for attaching the removed headrest to the rear surface of the seat cushion near its upper end.

Upon return of the seat back to its use position, the seat operator must first remove the headrest from its stored position, return the seat back to its upright position and then re-install the headrest. Such a procedure can result in a significant inconvenience to the user and relies on the user's diligence to re-install the headrest once the seat assembly has been returned to its use position.

Accordingly, it is an object of the present invention to provide a less cumbersome means for moving the headrest from its normal position when the seat back is stored to reduce the seat back height.

It is another object of the present invention to eliminate separate actuation of a latch handle/lever to release and fold the seat back after moving the headrest from the normal use position.

It is a further object of the present invention to provide a seat assembly in which movement of the headrest does not require user intervention to reattach the headrest when the seat back is returned to its use position.

It is a feature of the present invention to provide a seat assembly in which the headrest is rotatably mounted to the seat back for movement between use and stored positions and in which the headrest is coupled to a seat back latch so that the seat back latch is actuated by the movement of the headrest to its stored position.

The headrest is provided with its own latch for holding a headrest in its use position and a handle is provided on the outboard side of the headrest to release the headrest latch and to guide the subsequent rotational motion of the seat back. After the headrest latch is released, the user rotates the headrest to its stored position relative to the backrest portion of the seat back. The headrest is coupled to a seat back latch via a linkage or pull cable or other mechanism such that the rotation of the headrest actuates the seat back latch to release the seat back. Once the seat back latch has been released, the operator, while still grasping the headrest handle, rotates the seat back forward to its stored position.

The seat back latch automatically reengages when the seat back is returned to its upright use position and the headrest is returned to its used position. In a preferred embodiment of the invention, the headrest is rotated to a stored position in which it extends forward from the backrest portion of the seat back. In this position, it is a visual indicator to a seat occupant that it is not in its intended use position and also makes it uncomfortable for the seat to be occupied. Thus, the seat occupant will be prompted to return the headrest to its use position before occupying the seat.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
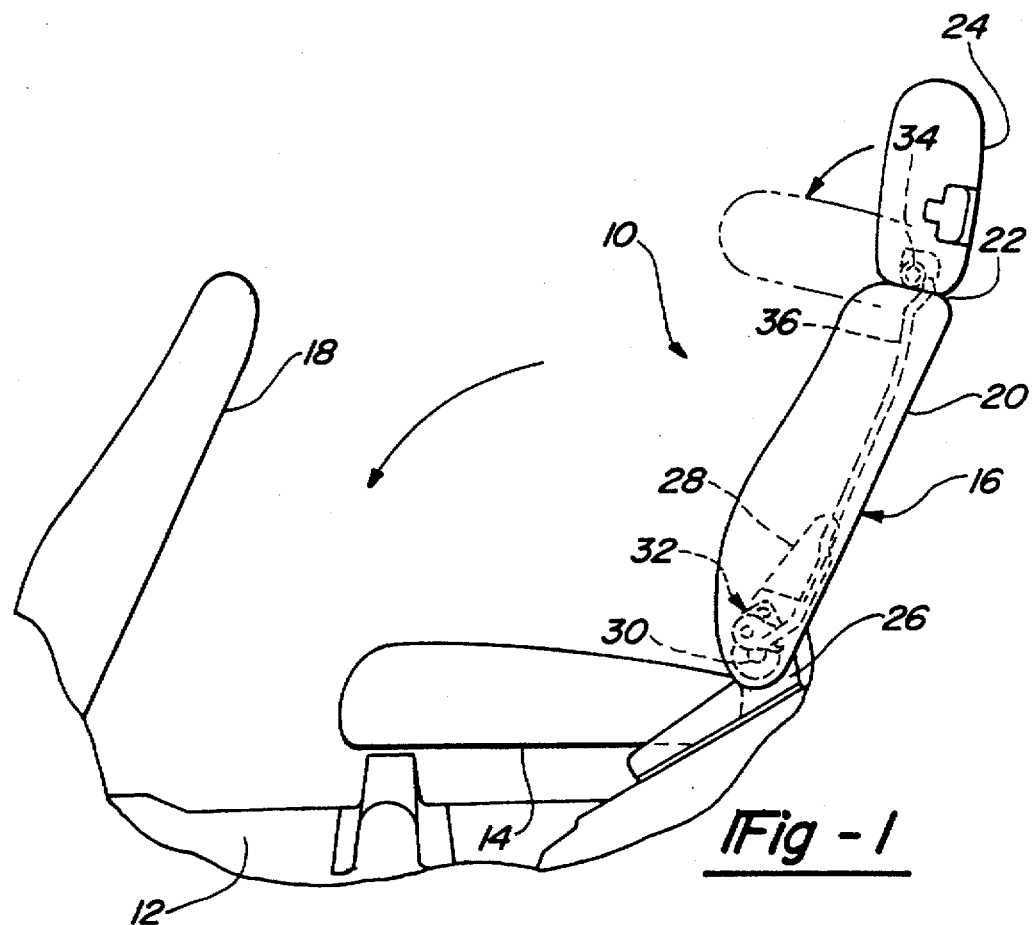
FIG. 1 is a side view of the vehicle seat assembly of the present invention in its use position.

The seat assembly of the present invention is shown in FIG. 1 and designated generally at 10. The seat assembly 10 is shown installed within a motor vehicle attached to the vehicle body 12. The seat assembly includes a generally horizontal lower seat cushion 14 and a seat back 16 extending upwardly at the rear end of the seat cushion 14. The seat assembly 10 is a rear seat or second row seat in a vehicle positioned behind the front row seats having a seat back 18, only a portion of which is shown. The seat back 16 of the seat assembly 10 includes a generally upright backrest 20 against which a seat occupant rests his or her torso and a headrest 24 extending upwardly from the upper end 22 of the backrest. The backrest 20 and headrest 24 form the seat back 16. The seat back 16 is pivotally mounted to a seat frame 26 which is in turn mounted to the vehicle body 12. The seat back contains its own frame 28 which is pivotally coupled to the seat frame 26 for rotation about a pivot 30. A seat back latch 32 is provided adjacent the pivot 30 for holding the seat back 16 in its generally upright use position shown in FIG. 1.

Figure 2:
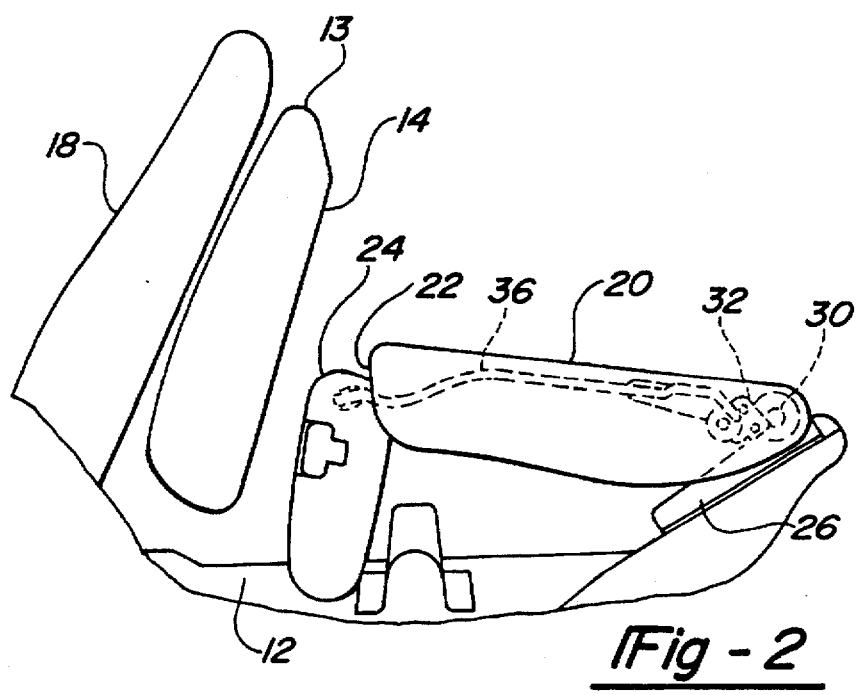
FIG. 2 is a side view similar to FIG. I showing the seat assembly moved to a stored position.

The seat assembly 10 is movable to a stored position when the seat is not needed to increase the cargo capacity of the vehicle. In the embodiment shown, the seat cushion 14 is rotated upward and forward by raising the rear end 13 of the seat cushion until the seat cushion extends generally upright, immediately behind the seat back 18 of the front seat. The mechanism for moving the seat cushion forms no part of the present invention and is not shown. Once the seat cushion 14 has been moved to its stored position, the seat back 16 is rotated forward and downward about the pivot 30 to a horizontal stored position (FIG. 2). However, with the addition of the headrest 24 at the upper end 22 of the backrest 20, the overall height of the seat back 16 is greater than the space provided between the pivot 30 and the stored seat cushion 14. To avoid this interference, the headrest 24 is mounted to the backrest for rotation about a pivot 34.

Movement of the seat back to its stored position is accomplished by first rotating the headrest 24 about the pivot 34 to a stored position. The stored position of the headrest is a position in which the headrest extends forward relative to the backrest 20 when the backrest is in its upright use position as shown in FIG. 1. As used herein, the headrest stored position is described as "forwardly extending" regardless of the backrest orientation. Once the backrest is rotated to its stored position, the headrest will no longer be extending forward but extends downward. By rotating the headrest to a forwardly extending position, the headrest provides an obvious signal to the a seat user that the headrest is not in its proper position. Furthermore, the seat assembly is uncomfortable to occupy when the headrest is in this position, thus further motivating a seat user to return the headrest to its upright position. It is within the scope of the present invention to provide a headrest which rotates rearward instead of forward to a stored position although this is not the preferred embodiment because it does not provide a visual indicator or make the seat assembly uncomfortable to use.

A rod or linkage 36 is coupled to the headrest and the seat back latch 32 for releasing the seat back latch upon rotation of the headrest to its stored position. The headrest contains a handle 38, preferably located on the outboard side of the seat assembly for easy access by a user standing outside of the vehicle, adjacent to the seat assembly 10. Movement of the seat back to is stored position is accomplished by grasping the seat at one location, namely the handle 38. Afterwards, two actions are required by the user, first rotating the headrest and second, rotating the backrest. This significantly reduces the complexity of storing the seat back as compared to previous seat assemblies in which the headrest must be completely removed from the backrest.

Figure 3:
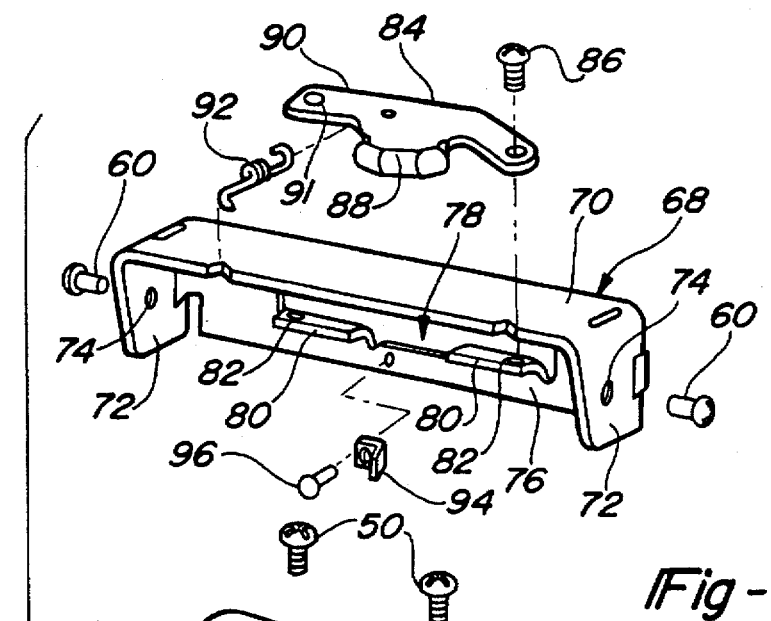
FIG. 3 is an exploded perspective view of the headrest mounting, rotation and latch mechanism.
Figure 4:
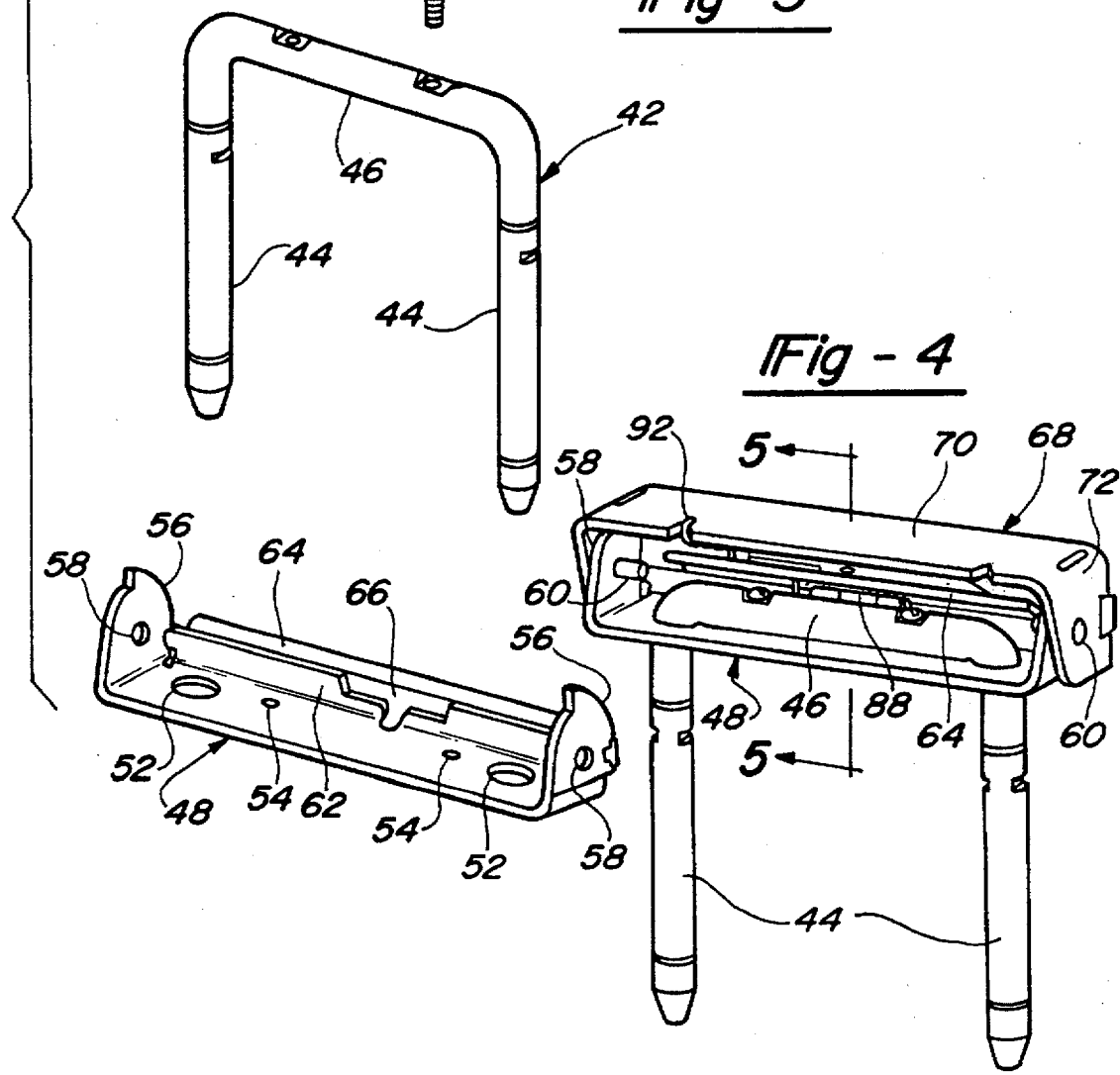
FIG. 4 is a perspective view of the mechanism shown in FIG. 3 in the assembly condition.

With reference to FIGS. 3 and 4, the headrest mounting and latch mechanisms are shown in greater detail. The headrest includes a mounting rod 42 which is bent into a U shaped configuration forming a pair of downwardly extending legs 44 and an upper horizontal crossbar 46. The legs 44 are inserted into a pair of sleeves (not shown) in the upper end of the backrest 20 for attachment of the headrest to the backrest in a conventional manner. The headrest 24 is not adjustable in its vertical position but has a single use position. An attaching bracket 48 is fixed to the mounting rod 42 by fasteners such as the screws 50. The bracket 48 has a pair of apertures 52 through which the legs 44 of the mounting rod extend. The screws 50 extend through the crossbar 46 and into apertures 54 in the attaching bracket. The bracket has a pair of opposite upturned ends 56 each having an aperture 58 which receives headrest pivot pins 60.

The rear of the bracket 48 has an upturned rear wall 62 with a forwardly inclined upper flange 64. The center of the rear wall 62 has an opening 66 which is closed at its upper end by the forwardly inclined upper flange 64.

The internal frame structure (not shown) of the headrest is attached to a pivot bracket 68. Bracket 68 has an upper wall 70 and down turned end walls 72. The end walls have apertures 74 which are aligned with the apertures 58 in the attaching bracket 48 and receive the pivot pins 60 for rotatably mounting the pivot bracket 68 to the attaching bracket 48. The pivot bracket rear wall 76 has a center opening 78, the lower edge of which is formed by two spaced flanges 80 which extend forward. Each of the flanges 80 have an aperture 82 therethrough.

The headrest latch includes a latch member 84 which is mounted to the pivot bracket 68 by a fastener such as screw 86 extending through one of the apertures 82. The latch member 84 has a forwardly extending engaging portion 88 and a release lever 90 for pivoting the latch member to a release position as described below. A spring 92 holds the latch member in the latch position in which the headrest is held in its upright use position.

Figure 5:
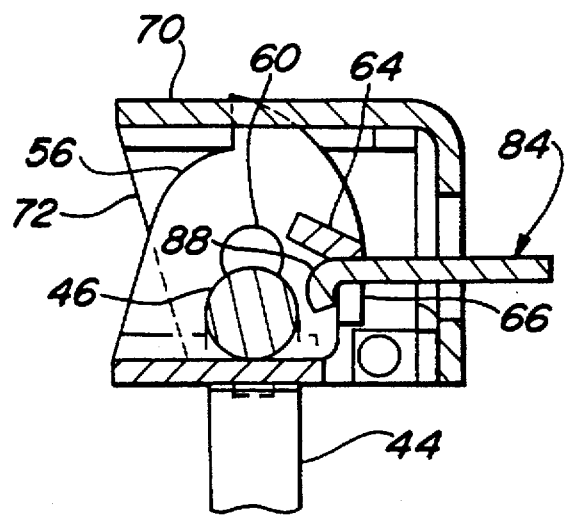
FIG. 5 is a side section view of the mechanism illustrated in FIG. 4 in the latched condition of the headrest in its use position as seen from the 5—5 of FIG. 4.

As can be best seen in FIG. 5, the engaging portion 88 of the latch member extends forward through the opening 66 in the attaching bracket 48. The flange 64 extends across the top of the opening 66 to prevent forward rotation of the pivot bracket 68 and thus prevent forward rotation of the headrest.

Figure 6:
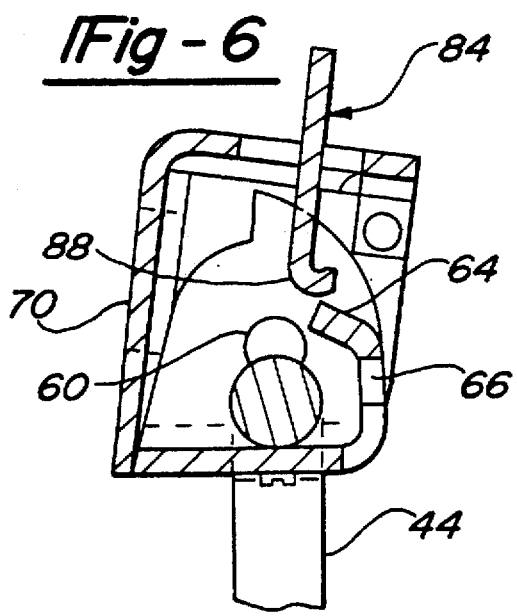
FIG. 6 is a side view similar to FIG. 5 showing the headrest in an unlatched condition and rotates to its stored position.

The headrest handle 38 is coupled to the release lever 90 of latch member 84 to rotate the latch member about the screw 86 to withdraw the engaging portion 88 from the opening 66 in the attaching bracket 48. Once this occurs, the pivot bracket is now enabled to rotate about the pivot pins 60 to the stored position shown in FIG. 6. Upon return of the headrest to its upright position, the rounded front of the engaging portion 88 will contact the forwardly inclined upper flange 64 which acts as a cam surface to guide the engaging portion 88 back into the opening 66 to re-latch the headrest.

Figure 7:
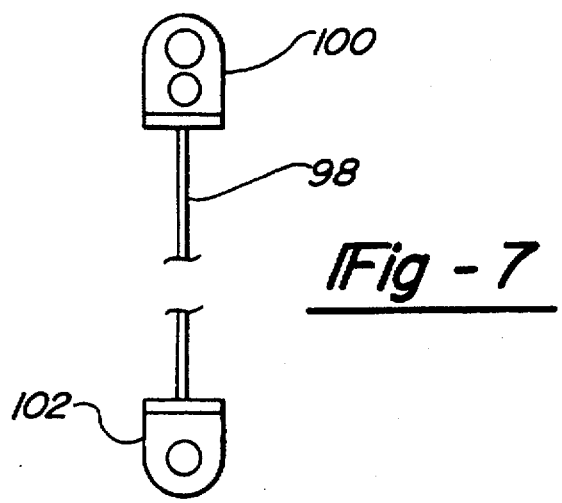
FIG. 7 is a fragmentary elevation of a pull cable for releasing the seat back latching.

With reference again to FIG. 3, a right angle connecting bracket 94 is attached to the rear wall 76 of the pivot bracket by a screw or rivet 96. The connecting bracket 94 is coupled to the upper end of the rod or linkage 36 whereby upon forward rotation of the pivot bracket, the rod 36 is pulled upward, to release the seat back latch 32. As an alternative to the rod or linkage 36, a pull cable 98 shown in FIG. 7, could be attached at its opposite ends 100 and 102 to the connecting bracket 94 and the seat back latch respectively.

The invention of the present invention provides a simplified manner for moving the seat back to a stored position. Once the handle 38 has been grasped and pulled, the user needs to rotate the headrest to its stored position, after which the user rotates the entire seat back forward by maintaining his grasp of the handle 38 to guide the seat back. The result is a simple, single handed operation of the seat back. While the invention has been described in the context of a seat in which the headrest rotates forward and downward, followed by rotation of the seat back forward and downward, other folding configurations of the seat components can utilize the features of the present invention if it is desired to reduce the overall height of the seat back when storing the seat.

Figure 8:
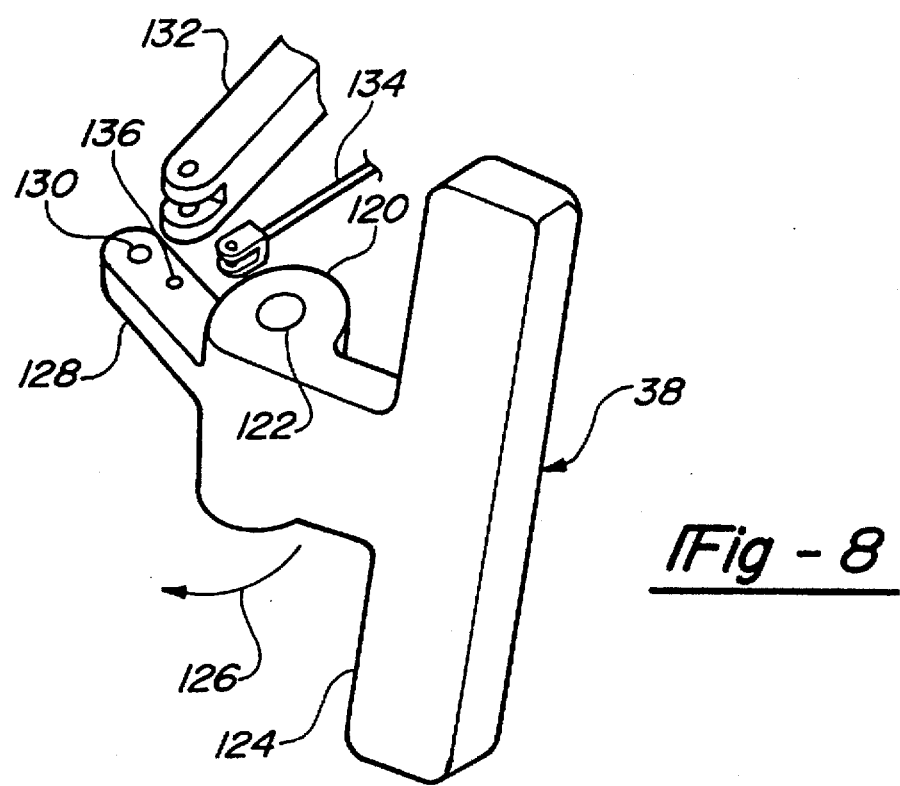
FIG. 8 is a perspective view of the headrest handle and connecting elements.

With reference to FIG. 8, the handle 38 is shown in greater detail. The handle 38 includes a mounting boss 120 which has an aperture 122 for receiving a pivot pin (not shown) to pivotally mount the handle 38 to the headrest. The handle includes a grip 124 to enable the handle to be gripped by a seat operator. By pulling the grip 124 outward, the handle 38 will rotate in the direction of arrow 126. Also extending from the boss 120 is an actuating lever 128. Lever 128 has an aperture 130 through which the lever is coupled to a link 132. The link 132 is in turn coupled to the headrest latch member 84 through the aperture 91 (FIG. 3). Thus, rotation of the handle 38 causes the latch member 84 to be moved out of its latch position to a release position enabling the headrest to be rotated as described above.

In an alternative embodiment of the invention, instead of releasing the seat back latch upon rotation of the headrest to its stored position, the seat back latch can be coupled directly to the handle 38 by a pull cable 134 attached to the handle actuating lever 128 through the aperture 136. In this embodiment, both the headrest latch and the seat back latch are released by rotation of the handle 38.

It is to be understood that the invention is not limited to the exact construction illustrated and described above, but that various changes and modifications may be made without departing from the spirit and scope of the invention as defined in the following claims.

We claim:

1. A vehicle seat assembly comprising:

a generally horizontal seat cushion having a rear end;

a seat back including a backrest with lower and upper ends having a use position extending upwardly from the rear end of the seat cushion and against which a seat occupant rests their torso, the seat back further including a headrest mounted at the upper end of the backrest, the headrest having a use position extending upwardly from the upper end of the backrest, the backrest being movable from its use position to a stored position;

a releasable seat back latch for holding the backrest in its upwardly extending use position;

the headrest being movably mounted to the backrest for movement relative to the backrest from its upwardly extending use position to a lower stored position; and connect means for connecting the headrest to the seat back latch for releasing the seat back latch in response to movement of the headrest from its use position to its stored position whereby the seat back is movable to its stored position.

2. The seat assembly of claim 1 further comprising a releasable headrest latch to hold the headrest in its use position, the headrest latch being releasable to enable movement of the headrest to its stored position.

3. The seat assembly of claim 2 further comprising a handle operable to release the headrest latch and, after release of the headrest latch, operable to guide the movement of the headrest to its stored position and to guide the seat back to its stored position by continued grasping of the handle.

4. The seat assembly of claim 1 wherein the headrest is rotatable forwardly about a transverse axis from its use position to its stored position, such that the headrest is extending forwardly relative to the backrest.

5. The seat assembly of claim I wherein the connect means for connecting the headrest to the seat back latch includes a linkage having at least one rod.

6. The seat assembly of claim 1 wherein the connect means for connecting the headrest to the seat back latch includes a pull cable.

7. A vehicle seat assembly comprising:

a generally horizontal seat cushion having a rear end;

a seat back including a backrest with lower and upper ends having a use position extending upwardly from the rear end of the seat cushion to an upper end and against which a seat occupant rests their torso, the seat back further including a headrest mounted at the upper end of the backrest, the headrest having a use position extending upwardly from the upper end of the backrest, the backrest being forwardly rotatable from its use position to a stored position;

a releasable seat back latch for holding the backrest in its upwardly extending use position;

the headrest being pivotally mounted to the backrest for rotation about a transverse axis to lower the headrest from its upwardly extending use position to a lower stored position relative to the backrest;

a releasable headrest latch for holding the headrest in its upwardly extending use position;

an operating handle pivotally mounted to the headrest and having a grip portion for grasping by a seat user; and connect means for operably connecting the handle to both the seat back latch and the headrest latch for releasing both latches upon rotation of the handle.

8. The seat assembly of claim 7 wherein the headrest is rotatable forwardly about a transverse axis from its use position to its stored position, such that the headrest is extending forwardly relative to the backrest when the backrest is in its upright use position.

9. The seat assembly of claim 7 wherein the backrest is rotatable forwardly about a transverse axis from its use position to its stored position, such that the backrest is generally horizontal in its stored position.

10. The seat assembly of claim 7 wherein the connect means includes a linkage having at least one rod.

11. The seat assembly of claim 7 wherein the connect means includes a pull cable.

* * * * *